United States Patent
Seo et al.

(10) Patent No.: US 10,547,413 B2
(45) Date of Patent: Jan. 28, 2020

(54) METHODS AND APPARATUS FOR MONITORING CANDIDATES OF CONTROL CHANNEL IN A CORESET

(71) Applicant: LG Electronics Inc., Seoul (KR)

(72) Inventors: Inkwon Seo, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/098,724

(22) PCT Filed: Aug. 13, 2018

(86) PCT No.: PCT/KR2018/009255
§ 371 (c)(1),
(2) Date: Nov. 2, 2018

(87) PCT Pub. No.: WO2019/031942
PCT Pub. Date: Feb. 14, 2019

(65) Prior Publication Data
US 2019/0140776 A1 May 9, 2019

Related U.S. Application Data

(60) Provisional application No. 62/615,939, filed on Jan. 10, 2018, provisional application No. 62/544,685, filed on Aug. 11, 2017.

(51) Int. Cl.
*H04L 1/00* (2006.01)
*H04L 5/00* (2006.01)
(Continued)

(52) U.S. Cl.
CPC ......... *H04L 1/0071* (2013.01); *H04B 7/0456* (2013.01); *H04B 7/0617* (2013.01); *H04L 5/0048* (2013.01); *H04L 5/0053* (2013.01)

(58) Field of Classification Search
CPC ... H04L 1/0071; H04L 5/0048; H04L 5/0053; H04B 7/0617; H04B 7/0456
See application file for complete search history.

(56) References Cited

U.S. PATENT DOCUMENTS

| | | | |
|---|---|---|---|
| 2009/0063929 A1* | 3/2009 | Jeong | H03M 13/1165 714/752 |
| 2014/0341143 A1 | 11/2014 | Yang et al. | |
| 2018/0376454 A1* | 12/2018 | Astrom | H04L 5/0005 |

FOREIGN PATENT DOCUMENTS

| | | | | |
|---|---|---|---|---|
| WO | WO-2013147523 A1 * | 10/2013 | | H04L 5/0023 |
| WO | WO2016018526 | 2/2016 | | |

OTHER PUBLICATIONS

U.S. Appl. No. 62/523,471, Collocation of SS Block With Other Broadcast Channels, filed Jun. 22, 2017. pp. 1-28 specification, pp. 1-12 drawings. (Year: 2017).*

(Continued)

*Primary Examiner* — Omar J Ghowrwal
(74) *Attorney, Agent, or Firm* — Fish & Richardson P.C.

(57) ABSTRACT

A user equipment, according to one embodiment of the present invention, monitors candidates of a control channel which schedules system information in a configured specific CORESET based on a PBCH signal, obtains the system information scheduled by the control channel, and obtain a only part of entire parameters for configuring the specific CORESET from the PBCH signal. In this case, the user equipment can monitor the candidates of the control channel by assuming that remaining parameters for configuring the specific CORESET not obtained through the PBCH signal are fixed as follows a size of 1 REG bundle is fixed to 6 REGs, a CCE-to-REG mapping type is fixed to interleaving, a row size of an interleaver for interleaving is fixed to 2, and a precoder granularity which is a unit of the same precoding assumption is fixed to 1 REG bundle.

20 Claims, 5 Drawing Sheets

(51) Int. Cl.
H04B 7/06 (2006.01)
H04B 7/0456 (2017.01)

(56) References Cited

OTHER PUBLICATIONS

NTT Docomo, Inc. (Rapporteur), R2-1706443, RAN WG's progress on NR WI in the May meeting 2017, 3GPP TSG RAN WG2 NR #AHS, Jun. 27-29, 2017 (Year: 2017).*
Ericsson, R1-1711374, NR-PBCH Content and payload size, 3GPP TSG RAN WG1 NR #AH, Jun. 27-30, 2017 See p. 3 (Year: 2017).*
LG Electronics, R1-1710305, Discussion on CORESET configuration, 3GPP TSG RAN WG1 NR #AH, Jun. 27-30, 2017 See p. 1 and 3 (Year: 2017).*
Huawei et al., R1-1709951, Configuration of control resource set, 3GPP TSG RAN WG1 NR #AH, Jun. 27-30, 2017 See p. 4 (Year: 2017).*
Intel Corporation, "CORESETs for NR PDCCH," R1-1707379, 3GPP TSG RAN WG1 #89, Hangzhou, P.R. China, May 15-19, 2017, 5 pages.
Guangdong OPPO Mobile Telecom, "PDCCH CORESET configuration and UE procedure on NR-PDCCH," R1-1707703, 3GPP TSG RAN WG1 meeting #89, Hangzhou, PR China, May 15-19, 2017, 7 pages.
Qualcomm Incorporated, "PDCCH structure," R1-1711633, 3GPP TSG RAN WG1 NR Ad-Hoc#2, Jun. 27-30, 2017, Qingdao, P.R. China, 6 pages.

* cited by examiner

METHODS AND APPARATUS FOR MONITORING CANDIDATES OF CONTROL CHANNEL IN A CORESET

CROSS-REFERENCE TO RELATED APPLICATIONS

This application is a National Stage application under 35 U.S.C. § 371 of International Application No. PCT/KR2018/009255, filed on Aug. 13, 2018, which claims the benefit of U.S. Provisional Application No. 62/615,939, filed on Jan. 10, 2018, and U.S. Provisional Application No. 62/544,685, filed on Aug. 11, 2017. The disclosures of the prior applications are incorporated by reference in their entirety.

TECHNICAL FIELD

The present invention relates to a wireless communication system, and more particularly, to a method of measuring and reporting a plurality of transmission beams in a wireless communication system and an apparatus therefor.

BACKGROUND ART

First, the existing 3GPP LTE/LTE-A system will be briefly described. Referring to FIG. 1, the UE performs an initial cell search (S101). In the initial cell search process, the UE receives a Primary Synchronization Channel (P-SCH) and a Secondary Synchronization Channel (S-SCH) from a base station, performs downlink synchronization with the BS, and acquires information such as a cell ID. Thereafter, the UE acquires system information (e.g., MIB) through a PBCH (Physical Broadcast Channel). The UE can receive the DL RS (Downlink Reference Signal) and check the downlink channel status.

After the initial cell search, the UE can acquire more detailed system information (e.g., SIBs) by receiving a Physical Downlink Control Channel (PDCCH) and a Physical Downlink Control Channel (PDSCH) scheduled by the PDCCH (S102).

The UE may perform a random access procedure for uplink synchronization. The UE transmits a preamble (e.g., Msg1) through a physical random access channel (PRACH) (S103), and receives a response message (e.g., Msg2) for the preamble through PDCCH and PDSCH corresponding to the PDCCH. In the case of a contention-based random access, a contention resolution procedure such as additional PRACH transmission (S105) and PDCCH/PDSCH reception (S106) may be performed.

Then, the UE can perform PDCCH/PDSCH reception (S107) and Physical Uplink Shared Channel (PUSCH)/Physical Uplink Control Channel (PUCCH) transmission (S108) as a general uplink/downlink signal transmission procedure. The UE can transmit UCI (Uplink Control Information) to the BS. The UCI may include HARQ ACK/NACK (Hybrid Automatic Repeat reQuest Acknowledgment/Negative ACK), SR (Scheduling Request), CQI (Channel Quality Indicator), PMI (Precoding Matrix Indicator) and/or RI etc.

DISCLOSURE OF THE INVENTION

Technical Task

A technical task of the present invention is to provide a method for a user equipment and a base station to more efficiently and accurately transmit/receive a PDCCH scheduling system information, via a PBCH based CORESET and an apparatus therefor.

It is to be understood that both the foregoing general description and the following detailed description of the present invention are exemplary and explanatory and are intended to provide further explanation of the invention as claimed.

Technical Solution

In an aspect of the present invention to achieve the technical task, a method of receiving a downlink signal by a user equipment (UE) in a wireless communication system, includes receiving a physical broadcast channel (PBCH) signal in a synchronization signal block (SSB), monitoring candidates of a control channel which schedules system information, in a specific control resource set (CORESET) configured based on the PBCH signal, and obtaining the system information scheduled by the control channel. The UE may obtain, through the PBCH signal, only a part of entire parameters for configuring the specific CORESET and the UE may monitor the candidates of the control channel by assuming that remaining parameters for configuring the specific CORESET not obtained through the PBCH signal are fixed as follows: a size of 1 resource element group (REG) bundle is fixed to 6-REG a control channel element (CCE)-to-REG mapping type is fixed to interleaving, a row size of an interleaver for the interleaving is fixed to 2, and a precoder granularity which is a unit of the same precoding assumption is fixed to 1 REG bundle.

In other aspect of the present invention to achieve the technical task, a user equipment receiving a downlink signal includes a transceiver and a processor to control the transceiver to receive a physical broadcast channel (PBCH) signal in a synchronization signal block (SSB), to monitor, in a specific control resource set (CORESET) configured based on the PBCH signal, candidates of a control channel which schedules system information, and to obtain the system information scheduled by the control channel. The processor may obtain, through the PBCH signal, only a part of entire parameters for configuring the specific CORESET and the processor may monitor the candidates of the control channel by assuming that remaining parameters for configuring the specific CORESET not obtained through the PBCH signal are fixed as follows: a size of 1 resource element group (REG) bundle is fixed to 6-REG, a control channel element (CCE)-to-REG mapping type is fixed to interleaving, a row size of an interleaver for the interleaving is fixed to 2, and a precoder granularity which is a unit of the same precoding assumption is fixed to 1 REG bundle.

The system information corresponds to a system information block (SIB) 1 and the specific CORESET may correspond to a CORESET 0 for transmitting the SIB 1.

The PBCH signal can indicate information on a monitoring period where the UE monitors the candidates of the control channel scheduling the system information in the specific CORESET.

The parameters for configuring the specific CORESET obtained by the UE through the PBCH signal can include a bandwidth of the specific CORESET and the number of symbols of the specific CORESET. The bandwidth of the specific CORESET and the number of symbols of the specific CORESET can be jointly encoded within the PBCH signal.

The bandwidth of the specific CORESET obtained through the PBCH signal can be restricted to one of 24, 48, and 96 resource units.

The parameters for configuring the specific CORESET obtained by the UE through the PBCH signal can further include an offset for indicating a position of the specific CORESET in frequency domain based on the SSB.

The UE can monitor the candidates of the control channel by assuming that CCE aggregation levels of the candidates of the control channel and the number of candidates per each CCE aggregation level are fixed.

In another aspect of the present invention to achieve the technical task, a method of transmitting a downlink signal by a base station in a wireless communication system, includes transmitting a physical broadcast channel (PBCH) signal in a synchronization signal block (SSB), transmitting, in a specific control resource set (CORESET) configured based on the PBCH signal, a control channel signal which schedules system information, and transmitting the system information scheduled by the control channel signal. The base station may indicate, through the PBCH signal, only a part of entire parameters for configuring the specific CORESET and the base station may transmit the control channel signal by fixing remaining parameters for configuring the specific CORESET not indicated through the PBCH signal as follows: a size of 1 resource element group (REG) bundle is fixed to 6-REG, a control channel element (CCE)-to-REG mapping type is fixed to interleaving, a row size of an interleaver for the interleaving is fixed to 2, and a precoder granularity which a unit of the same precoding assumption is fixed to 1 REG bundle.

The system information corresponds to a system information block (SIB) 1 and the specific CORESET may correspond to a CORESET 0 for transmitting the SIB 1.

The PBCH signal can indicate information on a monitoring period where a user equipment (UE) monitors the control channel signal scheduling the system information in the specific CORESET.

The parameters for configuring the specific CORESET indicated through the PBCH signal include a bandwidth of the specific CORESET and the number of symbols of the specific CORESET and the bandwidth of the specific CORESET and the number of symbols of the specific CORESET can be jointly encoded within the PBCH signal.

The bandwidth of the specific CORESET indicated through the PBCH signal can be restricted to one of 24, 48, and 96 resource units.

The parameters for configuring the specific CORESET indicated through the PBCH signal can further include an offset for indicating a position of the specific CORESET in frequency domain based on the SSB.

The base station can transmit the control channel signal by assuming that CCE aggregation levels available for the control channel signal and the number of candidates per each CCE aggregation level are fixed.

Advantageous Effects

According to one embodiment, since a user equipment assumes fixed values for a part of CORESET configuration parameters not indicated by a PBCH, the user equipment and a base station can more efficiently and accurately transmit/receive PDCCH, which schedules system information, via CORESET without increasing signaling overhead of a PBCH having a limited size.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

MODE FOR INVENTION

Figure 1:
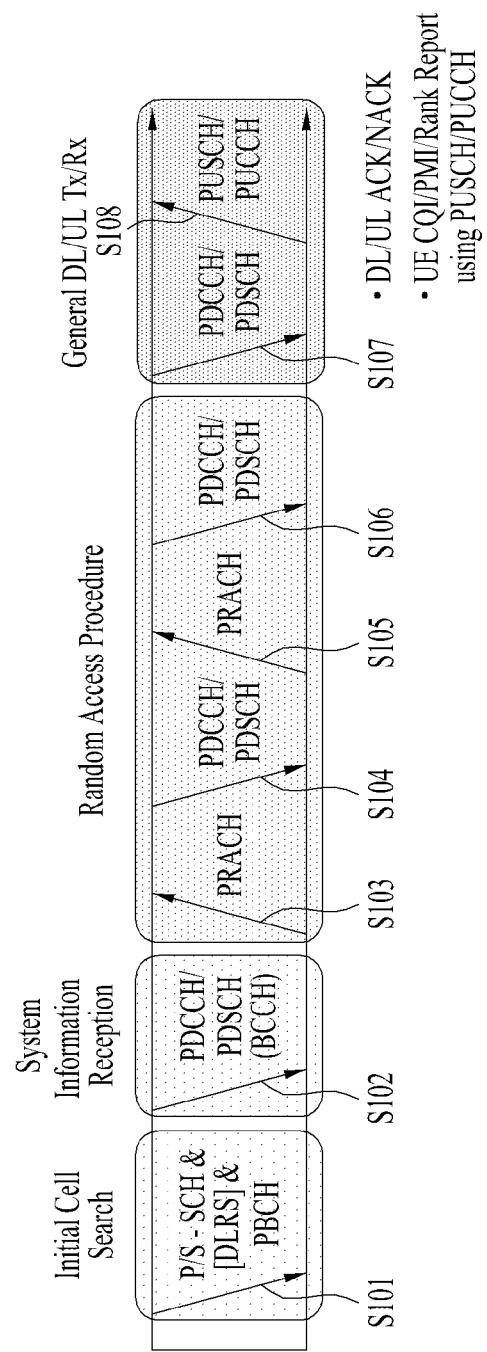
FIG. 1 illustrates physical channels used in 3GPP LTE/LTE-A system and a general signal transmission method using the physical channels.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi™), IEEE 802.16 (WiMAX™), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP LTE system or 3GPP LTE-A system, by which the technical idea of the present invention may be non-limited. Specific terminologies used in the following description are provided to help understand the present invention and the use of the terminologies can be modified to a different form within a scope of the technical idea of the present invention.

As many as possible communication devices have demanded as high as communication capacity and, thus, there has been a need for enhanced mobile broadband (eMBB) communication compared with legacy radio access technology (RAT) in a recently discussed next-generation communication system. In addition, massive machine type communications (mMTC) for connecting a plurality of devices and objects to provide various services anytime and anywhere is also one of factors to be considered in next-generation communication. In addition, in consideration of a service/UE that is sensitive to reliability and latency, ultra-reliable and low latency communication (URLLC) has been discussed for a next-generation communication system.

As such, new RAT that considers eMBB, mMTC, URLCC, and so on has been discussed for next-generation wireless communication.

Some LTE/LTE-A operations and configuration that are not at variance to a design of New RAT may also be applied to new RAT. For convenience, new RAT may be referred to as 5G mobile communication.

<NR Frame Structure and Physical Resource>

In an NR system, downlink (DL) and downlink (UL) transmission may be performed through frames having duration of 10 ms and each frame may include 10 subframes. Accordingly, 1 subframe may correspond to 1 ms. Each frame may be divided into two half-frames.

1 subframe may include $N_{symb}^{subframe,\mu} = N_{symb}^{slot} \times N_{slot}^{subframe,\mu}$ contiguous OFDM symbols. $N_{symb}^{slot}$ represents the number of symbols per slot, $\mu$ represents OFDM numerology, and $N_{slot}^{subframe,\mu}$ represents the number of slots per subframe with respect to corresponding $\mu$. In NR, multiple OFDM numerologies shown in Table 1 below may be supported.

TABLE 1

| $\mu$ | $\Delta f = 2^\mu \cdot 15 [kHz]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

In Table 1 above, $\Delta f$ refers to subcarrier spacing (SCS). $\mu$ and cyclic prefix with respect to a DL carrier bandwidth part (BWP) and $\mu$ and cyclic prefix with respect to a UL carrier BWP may be configured for a UE via UL signaling.

Table 2 below shows the number of $N_{symb}^{slot}$ of symbols per slot, the number $N_{slot}^{frame,\mu}$ of symbols per frame, and the number $N_{slot}^{subfame,\mu}$ of slots per subframe with respect to each SCS in the case of normal CP.

TABLE 2

| $\mu$ | $N_{symb}^{slot}$ | $N_{slot}^{frame,\mu}$ | $N_{slot}^{subframe,\mu}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Table 3 below shows the number $N_{symb}^{slot}$ of symbols per slot, the number $N_{slot}^{frame,\mu}$ of slots per frame, and the number $N_{slot}^{subfame,\mu}$ of slots per subframe with respect to each SCS in the ca se of extended CP.

TABLE 3

| $\mu$ | $N_{symb}^{slot}$ | $N_{slot}^{frame,\mu}$ | $N_{slot}^{subframe,\mu}$ |
| --- | --- | --- | --- |
| 2 | 12 | 40 | 4 |

As such, in an NR system, the number of slots included in 1 subframe may be changed according to subcarrier spacing (SCS). OFDM symbols included in each slot may correspond to any one of D (DL), U (UL), and X (flexible). DL transmission may be performed in a D or X symbol and UL transmission may be performed in a U or X symbol. A Flexible resource (e.g., X symbol) may also be referred to as a Reserved resource, an Other resource, or a Unknown resource.

In NR, one resource block (RB) may correspond to 12 subcarriers in the frequency domain. A RB may include a plurality of OFDM symbols. A resource element (RE) may correspond to 1 subcarrier and 1 OFDM symbol. Accordingly, 12 REs may be present on 1 OFDM symbol in 1 RB.

A carrier BWP may be defined as a set of contiguous physical resource blocks (PRBs). The carrier BWP may also be simply referred to as a BWP. A maximum of 4 BWPs may be configured for each of UL/DL link in 1 UE. Even if multiple BWPs are configured, 1 BWP may be activated for a given time period. However, when a supplementary uplink (SUL) is configured in a UE, 4 BWPs may be additionally configured for the SUL and 1 BWP may be activated for a given time period. A UE may not be expected to receive a PDSCH, a PDCCH, a channel state information-reference signal (CSI-RS), or a tracking reference signal (TRS) out of the activated DL BWP. In addition, the UE may not be expected to receive a PUSCH or a PUCCH out of the activated UL BWP.

<NR DL Control Channel>

In an NR system, a transmissions NR system, a transmission unit of a control channel may be defined as a resource element group (REG) and/or a control channel element (CCE), etc. The CCE may refer to a minimum unit for control channel transmission. That is, a minimum PDCCH size may correspond to 1 CCE. When an aggregation level is equal to or greater than 2, a network may group a plurality of CCEs to transmit one PDCCH (i.e., CCE aggregation).

An REG may correspond to 1 OFDM symbol in the time domain and may correspond to 1 PRB in the frequency domain. In addition, 1 CCE may correspond to 6 REGs.

A control resource set (CORESET) and a search space (SS) are briefly described now. The CORESET may be a set of resources for control signal transmission and the search space may be aggregation of control channel candidates for perform blind detection. The search space may be configured for the CORESET. For example, when one search space is defined on one CORESET, a CORESET for a common search space (CSS) and a CORESET for a UE-specific search space (USS) may each be configured. As another example, a plurality of search spaces may be defined in one CORESET. For example, the CSS and the USS may be configured for the same CORESET. In the following example, the CSS may refer to a CORESET with a CSS configured therefor and the USS may refer to a CORESET with a USS configured therefor, or the like.

A base station can signal information on a CORESET to a user equipment (UE). For example, a CORESET configuration is signaled to a UE for each CORESET. The CORESET configuration can include time duration of a CORESET (e.g., 1/2/3 symbols), a frequency domain resource of the CORESET, a precoder granularity, an REG-to-CCE mapping type (e.g., interleaved/non-interleaved), in case of the interleaved REG-to-CCE mapping type, an REG bundling size, an interleaver size, and the like.

If REG-to-CCE mapping for 1-symbol CORESET corresponds to the non-interleaved type, 6 REGs for CCE are grouped as a single REG bundle and the REGs for the CCE are consecutive. If there are multiple CCEs within 1 PDCCH (e.g., when an aggregation level is equal to or greater than 2), the CCEs can be consecutive. A UE may assume the same precoding within 1 REG bundle according to a precoder granularity or assume the same precoding for a plurality of REG bundles.

If REG-to-CCE mapping for 1-symbol CORESET corresponds to the interleaved type, 2, 3, or 6 REGs can be configured as 1 REG bundle. For example, it may be able to support such an REG bundle size as {2}, {3}, {2,3}, {2,6}, {3,6}, or {2,3,6} as a subset rather than support all REG bundle sizes of 2, 3, and 6. In case of supporting an REG bundle size of {2,6}, 1 REG bundle can be configured by 2 REGs or 6 REGs. A UE may assume the same precoding within 1 REG bundle or assume the same precoding for a plurality of REGs.

When REG-to-CCE mapping is performed on a CORESET having duration equal to or longer than 2 symbols, it may define an REG bundle in time/frequency domain. If an REG bundle is defined in time domain, all REGs belonging to 1 REG bundle belong to the same RB and the REGs may correspond to symbols different from each other. If an REG bundle is defined in time-frequency domain, 1 REG bundle belongs to the same RB and can include not only REGs corresponding to symbols different from each other but also REGs belonging to a different RB.

When REG-to-CCE mapping is performed on a CORESET having duration equal to or longer than 2 symbols, it may be able to support time-first mapping to the REG-to-CCE mapping. An REG bundle can be configured to be identical to time domain duration of a CORESET in time domain. In case of the non-interleaved type, 6 REGs constructing a CCE may correspond to 1 REG bundle and the REGS of the CCE can be localized in time/frequency domain. In case of the interleaved type, 2, 3, or 6 REGs may correspond to 1 REG bundle and REG bundles can be interleaved within a CORESET. A UE may assume the same precoding within 1 REG bundle according to a precoder granularity or assume the same precoding for a plurality of REG bundles.

<Common CORESET Configuration>

In NR system, a plurality of CORESETs (e.g., resource regions in which resource indexing for transmitting and receiving a control channel is performed) can be set to a single UE for a control channel. The UE can perform blind decoding in a corresponding CORESET according to a CORESET configuration and a search space set configuration.

A CORESET can be mainly classified into two types according to a scheme of signaling a CORESET configuration. One type of a CORESET corresponds to a common CORESET indicated by a PBCH or the like in the middle of performing an initial access procedure and another type of a CORESET corresponds to a UE-specific CORESET indicated by UE-dedicated higher layer signaling or the like. In this case, common and UE-specific have a meaning of configuring a CORESET. It may be able to forward (group) common information (or UE-specific information) for a plurality of UEs via a CSS of a UE-specific CORESET (or in a common CORESET).

The common CORESET corresponds to a CORESET in which PDCCH for scheduling RMSI (e.g., SIB1) is transmitted. The name of the common CORESET can also be referred to as an RMSI CORESET, a CORESET for RMSI, a CORESET indicated/configured by a PBCH, a CORESET in an initial access procedure, or a CORESET 0. The RMSI (remaining system information) can also be referred to as minimum SI (system information) or SIB 1.

The common CORESET can be used for the purpose of scheduling RMSI (remaining system information) (e.g., SIB 1) corresponding to information necessary for a UE in an initial access procedure. In case of the common CORESET, since CORESET configuration is given by a PBCH, it is preferable to set a limit on configurability of the common CORESET to reduce overhead of the PBCH. To this end, partial contents (e.g., parameters) of the common CORESET configuration can be fixed to a predefined value to omit signaling. Preferably, it may be able to reduce an information size by performing joint encoding on the partial contents with other contents.

In the following, a method of configuring a value of each of contents of CORESET configuration, a method of fixing a value of each of contents, and/or a method of performing joint encoding are proposed. The methods described in the following are explained centering on a common CORESET, by which the present invention may be non-limited. The methods can also be applied to a UE-specific CORESET. For example, the contents of the present invention can also be applied to reduce RRC signaling overhead of the UE-specific CORESET.

* CORESET Bandwidth

A CORESET BW (bandwidth) corresponds to a region occupied by a CORESET in frequency domain.

Configurability of CORESET BW:

If a CORESET BW is configurable, it may have a merit in that network flexibility is guaranteed. However, since overhead of a PBCH increases, it is preferable to reduce the number of BW values capable of being used for a CORESET.

For example, a unit resource size is defined in advance, and a network can configure one of multiples of the unit resource size as a BW of a CORESET.

For example, values described in (i) to (vi) can be considered as a unit resource size.

(i) UE minimum BW: In NR, a minimum BW to be supported by each UE can be defined. For example, a network can configure a UE minimum BW value or a UE minimum BW value*N (e.g., N=½, 2, 4, etc.) as a CORESET BW.

(ii) SS block BW: A minimum system BW supported in NR can be defined. For example, a network can configure a minimum system BW value or a minimum system BW value*N (e.g., N=½, 2, 4, etc.) as a CORESET BW.

(iii) SS block BW: SSB (Synchronization Signal block) BW (i.e., a BW on which a sync. signal and a PBCH are transmitted) can be defined. For example, a network can configure an SSB BW value or an SSB BW value*N (e.g., N=½, 2, 4, etc.) as a CORESET BW.

(iv) Unit resource size: A unit resource size can be defined (e.g., 5 MHz) in advance for CORESET BW configuration. For example, a network can configure a unit resource size value or a unit resource size value*N (e.g., N=½, 2, 4, etc.) as a CORESET BW.

(v) REG (or CCE) number: A network can configure (fix) a size of a CORESET by the number of control resource units (e.g., REGs, CCEs, candidates, etc.) within the CORESET. For example, the network defines options such as control resource units 24, 48, 72, and 96 in advance and can configure one of the predefined values as a CORESET BW.

The control resource unit-based CORESET BW configuration can also be interpreted as (max) aggregation level (AL) and/or the number of control channel candidates. For example, a network can configure an aggregation level and candidates capable of being transmitted at the same time in a specific CORESET. For example, the network can configure the number of AL8 candidates capable of being supported at the same time in a corresponding CORESET on the basis of AL (aggregation level) 8 candidates (=48 REGs) (e.g., if the number of AL8 candidates corresponds to 2, a CORESET corresponding to 96 REGs is configured).

In particular, if a resource size of a CORESET is signaled by the number of REGs or the like, a BW of the CORESET can be determined in association with CORESET duration (i.e., Number of OFDM symbols). For example, if CORESET duration is configured by 2 in association with 96 REGs CORESET, a BW of the CORESET can be determined by 48 REGs.

(vi) A CORESET BW and CORESET duration can also be indicated by joint configuration. A plurality of combinations [BW & duration] are defined in advance or can be signaled by a network. The network may set a specific combination to a CORESET via a PBCH (or UE-dedicated signaling). For example, when there are two combinations defined by [48 REGs & 2 symbols] and [96 REGs & 1 symbol], the network may set one of the combinations to a CORESET via 1-bit signaling.

Fixed Bandwidth:

If a CORESET BW is fixed, one of the proposed values can be selected as a fixed value. For example, a BW of a common CORESET can be fixed to one of an SS block BW (=24 REGs), a UE minimum BW (e.g., 20 MHz), a minimum system BW (e.g., 5 MHz), and a CORESET unit resource (e.g., 48 REGs). As mentioned in the foregoing description, if a CORESET resource size is represented by the number of REGs (e.g., 48 REGs), a BW of a CORESET can be determined in consideration of CORESET duration.

* Target Signal Configuration

A transmission period of information transmitted by a network can be differently configured according to information. If a different CORESET is configured for each of information having a different period, signaling overhead increases. On the contrary, if a UE performs blind detection on information different from each other within a single CORESET, it may cause the increase of UE processing overhead.

For example, since RMSI transmitted via a common CORESET corresponds to information necessary for an initial access procedure and important system information, the RMSI is not dynamically changed in general. For example, in LTE, system information is transmitted with a transmission period of 80 ms.

If monitoring periodicity shorter than a period of changing RMSI is set to a common CORESET for the RMSI, it may cause a problem that a UE unnecessarily performs repetitive decoding on the RMSI. Meanwhile, if a network additionally configures a CORESET for CSS after an initial access of a UE, it may cause a problem of increasing signaling overhead.

In particular, when different information is transmitted, if the same configuration (e.g., with/without interleaving transmission type, etc.) is used, it is preferable to reuse a common CORESET for RMSI as a CORESET for CSS after the initial access.

According to one embodiment of the present invention, it may be able to additionally set sub-monitoring sets for different control information to CORESET configuration. For example, an occasion period of a common CORESET is configured (fixed) by 10 ms, a monitoring period for RMSI-RNTI is configured by 80 ms, and a monitoring period for other SI (e.g., SI-RNTI) can be configured by 20 ms. Having received the CORESET configuration, a UE can perform monitoring according to a sub-monitoring period associated with specific information when the specific information is monitored in the CORESET. Additionally, a configuration for the sub-monitoring period (or the specific information) can be additionally indicated. For example, a network configures a UE to respectively blind detect a single candidate from AL 4 and AL 8 in a monitoring set for RMSI-RNTI and can configure the UE to respectively detect two candidates from AL 4 and AL 8 in a monitoring period for SI-RNTI.

In the example above, although the specific information detected by RNSI-RNTI, SI-RNTI, or the like has been explained for clarity, the specific information can include information forwarded via a control channel such as paging, Msg2/4, a fallback operation, and the like.

* RS (Reference Signal) Configuration

An NR control channel may have various reference signal configurations.

In relation to control channel capacity, 48 REGs are required for AL8 candidates in 1 symbol CORESET in NR and 48 REGs of 1 symbol correspond to a BW of 10 MHz. In particular, if a plurality of UEs perform monitoring on the same CORESET, capacity for a control channel becomes insufficient. Since robustness is an important factor for a control channel, the control channel may frequently use a high aggregation level. In this case, a capacity deficient problem of the control channel may become worse.

As a method of overcoming the capacity problem of the control channel, it may consider MU (multi-user)-MIMO. When MU-MIMO is applied for a control channel, it may be preferable to apply orthogonal MU-MIMO for the robustness of the control channel.

In case of considering orthogonal MU-MIMO and channel estimation performance of each layer, it is preferable to allocate two orthogonal antenna ports per 1 REG for an RS in NR and it is preferable for each RS port to transmit an RS (e.g., PDCCH DMRS) in two REs within 1 REG For example, in the aspect of an REG, overhead of RS transmission may correspond to 1/3 compared to overhead of control channel transmission.

On the contrary, in the aspect of a single UE, in order to improve performance of a control channel in a low aggregation level or a high coding rate, it is preferable to reduce RS overhead. Or, in order to improve channel estimation performance in a high aggregation level, it is preferable to increase density of an RS port used by a UE. In the former case, it may consider a method for a network/UE to reduce RS overhead to 1/4. In the latter case, it may consider a method for a network/UE to apply RS overhead of 1/3 (e.g., 4 REs are used for 1 RS port within an REG).

According to one embodiment of the present invention, RS density and/or the number of RS antenna ports can be configured according to a CORESET. In addition, an RS pattern (e.g., front-loaded RS, full-loaded RS) can be configured as well. For example, all or a part of 1/4 density with 1-port, 1/3 density with 2-port (e.g., FDM), and 1/3 density with 1-port options can be defined in advance or can be configured via higher layer signaling of a network. The network can designate RS configuration used in a corresponding CORESET via CORESET configuration. For example, in case of the 1/3 density with 2-port, information on an RS port to be used (e.g., port index, etc.) and/or information on an RS port on which rate matching is to be performed can be additionally signaled or can be implicitly determined (e.g., based on UE ID). The network can indicate a UE to perform interference measurement on a specific RS port.

* Aggregation Level and Number of Candidates According to AL

An aggregation level can be implicitly determined according to the number of available resources (e.g., REG, CCE) within a resource region of a configured CORESET.

For example, if the number of available REGs according to a time/frequency resource configuration of a CORESET is greater than 48, the maximum aggregation level for performing blind decoding performed by a UE in the CORESET can be determined by 8. The number of candidates can also be determined according to an amount of available resources. For example, the number of candidates for AL8 can be implicitly determined by the quotient resulted from dividing the number of available REGs by 48.

In case of the number of candidates for each AL, the maximum value of the number of candidates according to each AL is fixed in advance and the actual number of candidates can be determined according to the number of available REGs. For example, if the maximum number of candidates for ALs 1, 2, 4, and 8 corresponds to 4, 4, 2, and 2, respectively, and the number of available REGs corresponds to 50, since 50/48=1.xx, the number of candidates for AL 8 corresponds to 1 and the number of candidates for the remaining ALs may correspond to the maximum value (e.g., 4, 4, 2) according to an AL.

* Interleaving Method

In NR, resource mapping of a CORESET can be classified into localized mapping (i.e., non-interleaved) and distributed mapping (i.e., interleaved) depending on whether or not interleaving is performed between REGs or REG bundles. The localized mapping corresponds to a form of gathering NR-PDCCH resources in a narrow region to maximize beamforming gain when UE-dedicated beamforming is mainly applied. When accuracy for channel state estimation (e.g., CSI reporting) is degraded, the distributed mapping can be used to obtain transmission diversity, time/frequency diversity, and the like.

Meanwhile, if a CORESET to which the localized mapping is applied is overlapped with a CORESET to which the distributed mapping is applied, a blocking issue may occur due to a different mapping method. For example, if NR-PDCCH of the localized mapping CORESET is transmitted in an overlapped region, it may have a case that it is unable to use a plurality of CCEs in the CORESET to which the distributed mapping is applied due to the NR-PDCCH of the localized mapping CORESET.

The blocking issue can be resolved by a method of performing interleaving in a unit of an REG bundle set. However, if CORESETs are not overlapped and a BW of a CORESET is wide, it is preferable to obtain a frequency diversity gain by performing interleaving in a unit of an REG bundle.

In particular, one embodiment of the present invention proposes a method of configuring an interleaving scheme according to a CORESET. For example, interleaving is performed in a unit of an REG bundle in a CORESET where overlap does not occur. If overlap occurs, interleaving can be performed in a unit of an REG bundle set in a CORESET to which the distributed mapping is applied. In particular, a method of performing interleaving can be implicitly determined in advance.

In addition, when interleaving is performed in a unit of an REG bundle set, a network can configure a size of the REG bundle set according to a CORESET. Since it is able to change a bundle size and/or a mapping rule according to the size of the REG bundle set, it is preferable for a network to determine the size of the REG bundle set in a procedure such as CORESET scheduling, and the like. Or, the size of the REG bundle set can be fixed to 2. This can be interpreted as an REG bundle set is configured by REGs of CCEs different from each other that construct AL 2 candidate.

Summary & Proposals

The aforementioned common CORESET configuration is summarized and proposals based on the configuration are explained.

For a more flexible operation, it is preferable to support multiple CORESETS having resources and attributes different from each other. For example, at least two or more CORESETs can be set to a single UE. One CORESET is shred between USS and CSS having distributed CCE-to-REG mapping and another CORESET may correspond to a CORESET specific to a USS having localized or distributed mapping.

Proposal 1: The number of CORESETs set to a single UE may correspond to 1 or 2.

* CORESET Configuration

A time/frequency resource of a CORESET can be obtained from an initial access procedure (e.g., PBCH and/or SI) or UE-specific higher layer signaling. A part of contents (e.g., a time/frequency resource, a transmission type, etc.) can be configured for a UE-specific CORESET. Besides, RS configuration, search space configuration, and the like can be included in CORESET configuration.

In NR, a UE can receive control information and data from a plurality of TRPs (transmission and reception points) at the same time. When control information is transmitted from a plurality of the TRPs, it may be preferable to set a different CORESET to each of a plurality of the TRPs. For example, it may be able to configure a CORESET-specific scrambling parameter associated with each TRP for a plurality of the TRPs. If a plurality of the TRPs are set to a UE, multiple transmission can be supported by a plurality of CORESETs. Or, DPS (dynamic point section) can be supported based CORESET selection.

And, it may be able to support MU-MIMO to NR-PDCCH using non-orthogonal DMRS. In order to distinguish UEs from each other included in the same MU-MIMO pair, a UE-specific RS scrambling parameter can be set to a CORESET.

In particular, the present invention proposes to assume a CORESET-specific RS scrambling sequence (e.g., using a virtual cell ID) for each UE. In relation to MU-MIMO, an orthogonal DMRS may have a gain in channel estimation and interference cancellation. Hence, if MU-MIMO using the orthogonal DMRS is introduced, it may be able to additionally configure information on an RS port.

For flexible management, each of CORESETs may have attributes different from each other for a different purpose. For example, a search space included in CORESETS different from each other may have a configuration of its own. An aggregation level and the number of candidates of each aggregation level can be set to each CORESET. A search type (e.g., CSS, USS, or CSS & USS) can be configured in accordance with a CORESET.

Proposal 2: RS-Related Information and a Search Space Type can be Configured for a UE-Specific CORESET.

A CORESET indicated in an initial access procedure can be cell-specifically configured and can be used for transmitting DCIs related to RMSI and RAR (random access response). The CORESET can be referred to as an RMSI CORESET or a common CORESET. Since a configuration of the common CORESET is provided by a PBCH, it is preferable to minimize a size of the configuration of the common CORESET and reduce overhead of the PBCH via a prescribed restriction.

Items described in the following can be considered as a common CORESET configuration for scheduling RMSI.

Bandwidth: If it is able to configure a common CORESET BW, it may be able to support several BW values only such as a BW identical to an SSB, a UE minimum BW, a BW wider than an SSB BW as much as double, ½ of UE minimum BW, and the like. In order to reduce signaling overhead, a CORESET BW can be jointly coded with duration. For example, a base station can configure one combination among 96-RB BW with 1 symbol and 48-RB BW with 2 symbols via 1-bit signaling. If multiple BWs having multiple durations are supported, it may select a partial set capable of covering ALs supported for an RMSI CORESET only to minimize signaling overhead. On the other hand, if a common CORESET BW is fixed, AL 8 candidate, (48+a) REGs necessary for transmitting other information, and CORESET duration can be associated with the fixed BW value. For example, a BW can be determined by number of REGs/CORESET duration.

Frequency position: If it is assumed that RMSI transmission is performed in every SS block (synchronization signal block), a CORESET for RMSI may correspond to a CORESET adjacent to an SS block. If RMSI is shared between SS blocks, it may indicate an offset between an SS block and an RMSI CORESET.

Starting symbol in time domain: An SS block may have various positions. For example, in case of a slot of 7 symbols of 15 kHz SCS, a starting symbol index of an SS block of an even-numbered slot corresponds to 2 and a starting symbol index of an SS block of an odd-numbered slot corresponds to 1. If a BW is narrow (e.g., 5 MHz) and a size of a CORESET is big (e.g., 96 REGs), a common CORESET and an SS block may not be positioned at the same slot. In order to solve the problem above, when rate matching is performed on an SS block position, a starting symbol can be fixed for an RMSI CORESET of which duration is greater than 1. Or, a slot capable of being scheduled by an RMSI CORESET may correspond to a slot not including an SS block or a slot (e.g., even-numbered slots) having symbols sufficient enough for arranging a CORESET. As a different method, it may assume that a size of an RMSI slot always corresponds to 14. Similar to a case of implementing 7 symbols as a mini slot, for clarity, it is preferable to define the size of the RMSI slot by a slot of a size of 14 symbols. If 7-symbol slot size is defined, the 7-symbol slot can be used for UE-specific data scheduling only. In an LTE-NR coexistence case, a start point of an RMSI CORESET can be controlled according to a size of an LTE PDCCH region. Hence, it is necessary to have information on a starting symbol of the RMSI CORESET. In order to minimize overhead of control signaling, similar to numerology used for LTE-NR coexistence and RMSI transmission, other information and information of the RMSI starting symbol can be jointly signaled. Table 4 illustrates joint encoding between starting symbol information of RMSI CORESET for LTE-NR coexistence and numerology for performing RMSI transmission. In LTE-NR coexistence case, it is assumed that the RMSI CORESET is transmitted in an MBSFN subframe only to avoid a collision with an LTE CRS.

TABLE 4

| Index | LTE-NR Coexistence | Numerology |
|---|---|---|
| 0 | Starting symbol = 3 | Same as SS block |
| 1 | Starting symbol = 3 | Twice of SS block |
| 2 | Starting symbol = 5 | Twice of SS block |
| 3 | Starting symbol = 1 | Same as SS block |
| 4 | Starting symbol = 1 | Twice of SS block |
| 5 (reserved) | | |
| 6 (reserved) | | |
| 7 (reserved) | | |

Monitoring period: For example, a monitoring period of a common CORESET can be fixed to 5 ms (i.e., SS block transmission period), 20 ms, or 80 ms (i.e., PBCH TTI). If an RMSI CORESET is shared with a CORESET for RAR/Msg.4, a monitoring period of the RMSI can be configured by a subset of a monitoring set of the common CORESET. If configurability is necessary, it may configure a period of the common CORESET (e.g., signaling of 2 or 4 bits).

CORESET duration: CORESET duration can be fixed according to SS block arrangement. If configurability of the CORESET duration is necessary, CORESET duration information can be signaled in a manner of being jointly coded with CORESET BW information.

RS information: RS information can be determined based on a cell ID.

REG bundling size, REG bundle set size: For example, REG bundling size and REG bundle set size can be fixed to a specific value such as 2 or 6.

Blind decoding configuration: The minimum blind decoding count supported by a UE can be configured by the minimum blind decoding count for an RMSI CORESET.

Consequently, information on time/frequency resources can be configured by a PBCH for a common CORESET. And, other information (e.g., RS information, information on a transmission type (e.g., interleaved/non-interleaved mapping) and/or information on an REG bundle (set) size) can be fixed to reduce PBCH overhead.

Proposal 3: For a CORESET configured by a PBCH, at least one of an REG bundling size, a transmission type (e.g., interleaved/non-interleaved mapping), and AL & the number of candidates (e.g., according to the number of available REGs) may be fixed.

Proposal 4: For a CORESET configured by a PBCH, a time/frequency resource (e.g., resource information including a CORESET starting position/BW and the like) can be signaled.

* Common CORESET for Multi-Beam Operation

In NR, it is able to support both a single beam operation and a multi-beam operation. In the aspect of a UE, it is necessary to indicate a resource to be monitored to perform control channel monitoring irrespective of the single/multi-beam operation. In particular, in case of using multiple beams, it may be able to transmit the same control channel via multiple occasions. It is necessary for a UE to identify a CSS of an occasion to be monitored among the multiple occasions. In the multi-beam operation, it is anticipated that multiple SS blocks are to be transmitted. Having received information via the best SS block, it is preferable for a UE to obtain specific system information (e.g., RMSI or minimum SI) via a beam identical to the best SS block. Information on a CSS for scheduling the specific system information can be transmitted by a PBCH. To this end, it may consider options described in the following.

Option 1: A PBCH of an SS block can indicate information of a CSS for specific system information that shares a beam direction identical to the SS block.

Option 2: A PBCH of an SS block can indicate a set of CSS resources for specific system information which is transmitted via beam sweeping.

Option 3: A PBCH of an SS block can indicate a CORESET in which a control channel for specific system information is transmittable via a single beam or multiple beams.

Figure 2:
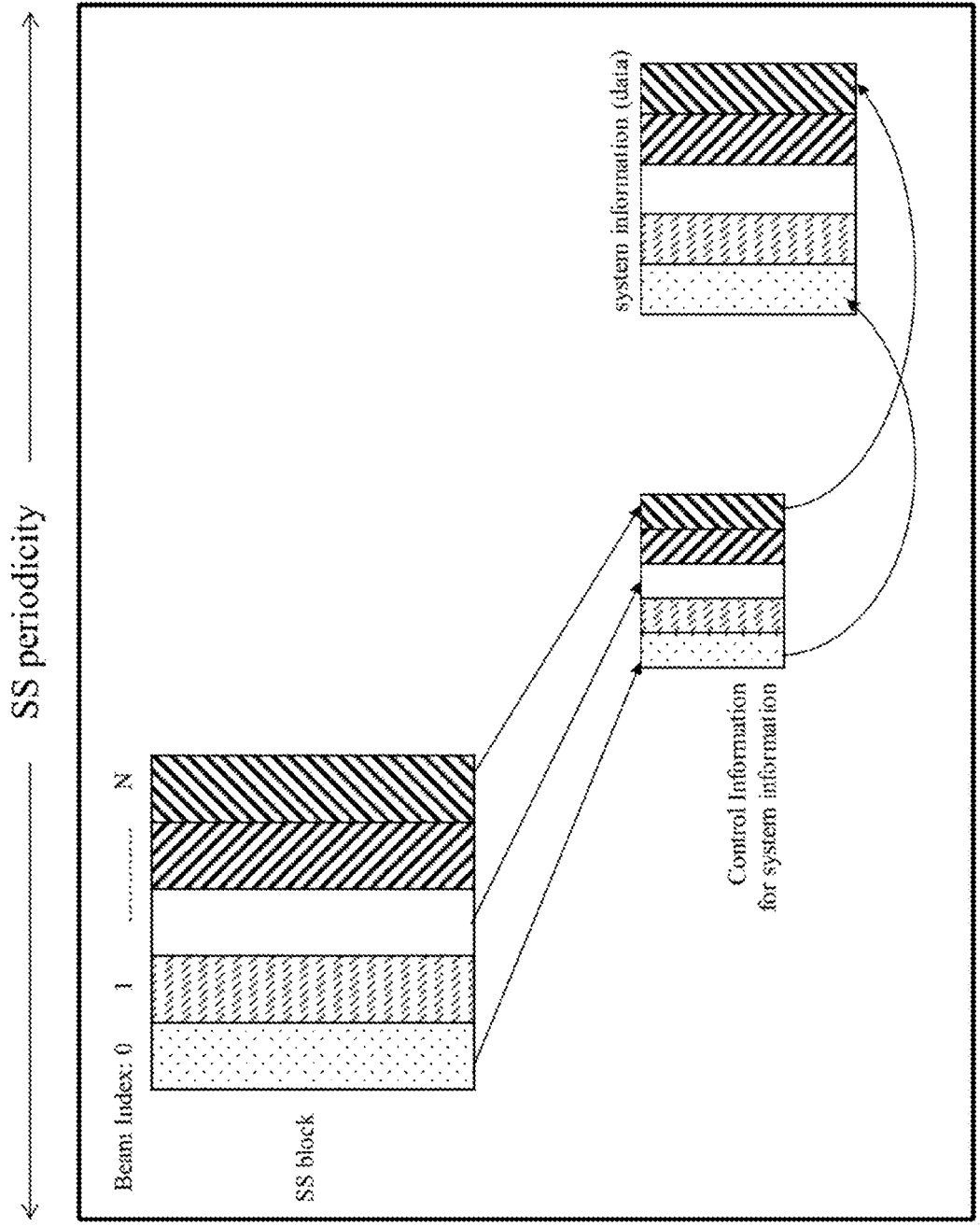
FIG. 2 is a diagram for explaining an indication of a control channel for specific system information according to one embodiment of the present invention.

FIG. 2 is a diagram for explaining an indication of a control channel for specific system information according to an option 1.

Referring to FIG. 2, a PBCH can indicate a CORESET related to a beam identical to the PBCH. In this case, since contents of the PBCH change (e.g., a different CORESET time/frequency resource is indicated according to each beam direction) and a resource for each beam is semi-statically fixed, flexible scheduling of specific system information transmission may not be supported. On the contrary, according to the option 1, since a UE can perform monitoring on a resource indicated for a target beam only, it is able to reduce CSS monitoring burden of the UE.

Figure 3:
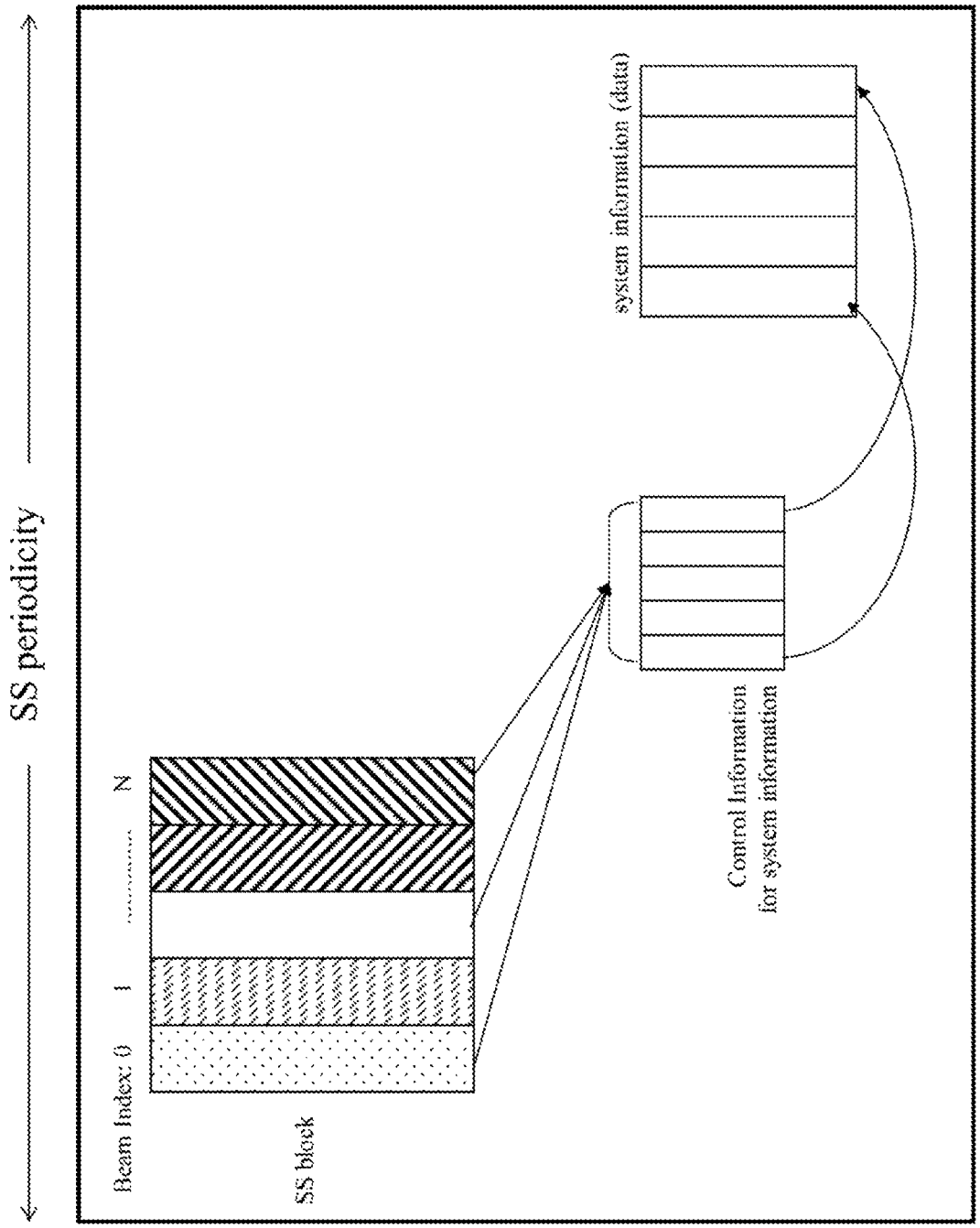
FIG. 3 is a diagram for explaining an indication of a control channel for specific system information according to a different embodiment of the present invention.

FIG. 3 is a diagram for explaining an indication of a control channel for specific system information according to an option 2.

Referring to FIG. 3, a PBCH can indicate a set of CORESETS for specific system information. A UE can assume beam sweeping in the set of CORESETs configured via the PBCH and can receive control information/data based on a beam index (e.g., an index of a beam used for receiving a PSS/SSS/PBCH) obtained via a reception procedure of the PSS/SSS/PBCH.

In order to minimize overhead of CORESET configuration, it may assume a control region of the same size for each beam. It may be able to configure duration of a control region of each beam, a size of the total control region, and a frequency position of a control region by assuming beam sweeping. According to the method above, it may be able to provide flexibility and the same contents to each PBCH. On the other hand, a blind decoding count of a UE can be increased. As a method of reducing the blind decoding count of the UE, it may use implicit mapping between an SS block and a configured control resource. For example, a CSS of each beam is sequentially transmitted in the total control region a UE can induce an OFDM symbol from which a corresponding beam is transmitted based on a beam index obtained from an SS block. For example, it may be able to assume implicit mapping between an SS block and a control resource of specific system information for a beam. A similar relationship can be defined between a control resource (or a data resource) of specific system information and different system information or an RAR control resource set. The method above has a demerit in that it is necessary to configure consecutive control regions for multiple beams and it may influence on data scheduling.

As a different option for resolving the problems according to the options 1 and 2, it may be able to indicate a common resource capable of scheduling specific system information. In this case, a beam(s) to be used in the indicated resource can be determined by a network. A UE can monitor a configured CSS until the specific system information is obtained by the UE.

Proposal 5: An indication of a common CORESET in a PBCH should be impact and it is not appropriate to indicate multiple CORESETs corresponding to multiple beams. For a CORESET for specific system information the aforementioned options 1 and 3 can be considered.

The proposed option 1 can be comprehended as each PBCH configures a CORESET corresponding to a beam for specific system information.

The proposed option 3 can be comprehended as each PBCH configures a CORESET capable of scheduling a different beam(s) at a monitoring occasion of a different network.

Handling of Overlapped CORESET

A CORESET can be overlapped with a different CORESET or an SS block within a slot. When CORESETs are overlapped with each other, a candidate of one CORESET may block a candidate of another CORESET. In order to reduce a blocking probability, as an intuitive method, an REG bundle boundary of each CORESET and an REG bundle size can be aligned in frequency domain. In order to align the REG bundle boundary, a frequency offset indicating a start point of REG bundling can be CORESET-specifically configured. If a frequency bundle size is not aligned between overlapped CORESETs or a different transmission type is configured in every CORESET, it may use REG bundle set-based interleaving.

If a CORESET is overlapped with an SS block within a slot (e.g., if a start point of the SS block corresponds to $3^{rd}$ OFDM symbol and duration of the CORESET corresponds to 3 OFDM symbols), it is unable to transmit control information in an overlapped region. In order to solve the problem above, it may consider a method of performing rate matching on control information in the overlapped region or a method of performing fallback with ½-symbol CORESET. In particular, when a multi-beam operation is performed in a manner that a CORESET and an SS block use a different beam, it is not preferable to multiplex the CORESET and the SS block in the same symbol. In this case, it is necessary to perform rate matching on all symbols in which the SS block is transmitted.

RMSI CORESET Configuration & Type 0-PDCCH CSS Set Configuration

First of all, a type 0-PDCCH CSS is briefly explained. The type 0-PDCCH CSS may correspond to a CSS configured via an MIB included in a PBCH or a CSS configured via a specific parameter (e.g., searchspace SIB1) of a common PDCCH configuration. In this case, a CRC can be configured for DCI scrambled by SI-RNTI. For example, PDCCH, which schedules PDSCH on which SIB1 is carried, can be transmitted via the type 0-PDCCH CSS and a CRC of the PDCCH can be scrambled by SI-RNTI.

In NR system, in relation to PDCCH decoding, a CORESET configuration, a search space set configuration, and the like are defined as follows.

In general, a CORESET configuration, which is received by a UE via UE-dedicated RRC signal, can include at least one of an ID of a CORESET, a scrambling ID of a PDCCH DMRS, time duration (e.g., 1/2/3/symbol) of the CORESET, a CORESET frequency domain resource, a CCE-to-REG mapping type of the CORESET (e.g., interleaved/non-interleaved), an REG bundle size of the CORESET, a CORESET sift index, TCI (transmission configuration indication)-StatesPDCCH (e.g., QCL-related information), and TCI-PresentInDCI (whether or not a TCI field exist in DCI).

In general, a search space set configuration can include at least one of a common-search-space-flag (e.g., information indicating whether or not a corresponding search space corresponds to a CSS), information on an aggregation level of candidates included in a corresponding search space set and the number of candidates according to an aggregation level, monitoring-offset-PDCCH-slot, and monitoring-symbols-PDCCH-within-slot (e.g., symbol information within a slot on which PDCCH monitoring is to be performed).

In order for a UE to obtain RMSI (e.g., SIB 1) in an initial access procedure, it is necessary for the UE to correctly obtain RMSI CORESET configuration and information on a type 0-PDCCH CSS based on a PBCH.

Meanwhile, when a UE performs initial access, since the UE is unable to know contents of system information (e.g., MIB, SIB) in advance, a network can broadcast control channel-related information necessary for receiving system information (e.g., SIB) such as RMSI and the like via a PBCH. Meanwhile, the number of bits for signaling the information can be restricted to 8 bits in consideration of signaling overhead of the PBCH.

Consequently, in order to receive system information such as SIB and the like via a control channel, CORESET and search space (e.g., type 0-PDCCH CSS)-related information should be defined by 8 bits information (e.g., RMSI-PD-CCH-Config.). In this case, 4 bits among the 8 bits can indicate time/frequency resource information of a CORESET. The remaining 4 bits can provide information on type 0-PDCCH CSS (e.g., monitoring occasion) included in the CORESET. Since the remaining information except the information forwarded by the 8 bits has no additional forwarding means, it is preferable to define the remaining information in advance. For example, QCL (quasi-co location)-related information is associated with an SSB (SS block) in which PBCH is received and scrambling-related information is defined to be associated with a cell ID.

One embodiment of the present invention proposes a method of determining the remaining information except the aforementioned information (e.g., time/frequency resource information of a CORESET, monitoring occasion, QCL-related information, scrambling-related information) among CORESET (e.g., CORESET for RMSI) and search space set configuration.

In the following description, when a parameter value is changed according to time/frequency resource allocation of a CORESET, it may indicate that a parameter is changed according to a value of a field indicating time/frequency resource allocation information of a PBCH.

* CCE-to-REG Mapping

A CCE-to-REG mapping type can indicate whether or not an REG bundle level uses interleaving. If the REG bundle level does not use interleaving, an REG constructing a single candidate and a CCE are defined to be contiguously arranged in time/frequency domain.

In general, when consecutive resources are used for transmitting PDCCH without interleaving, a network knows a channel state and the like between a base station (e.g., gNB) and a UE. In this case, the network can improve decoding performance of a UE by using precoding appropriate for a channel state.

However, since it is difficult for a UE to perform feedback in an initial access procedure and it is necessary for a base station to transmit the same information to a plurality of UEs, it is preferable for the base station to improve decoding performance of the UE according to frequency diversity gain and transmission diversity gain (e.g., transmission diversity gain by precoder cycling) using interleaving. In particular, one embodiment of the present invention proposes to use interleaving of an REG bundle-level in a CORSET configured by a PBCH and a search space using the CORESET.

CORESET duration of the CORESET configured by the PBCH may correspond to the number of OFDM symbols occupied by the CORESET. The CORESET duration can be configured by 1, 2, or 3 symbols. In addition, the CORESET configured by the PBCH can include type 0-PDCCH CSS and the type 0 CSS can use aggregation level 4, 8, and 16 only. In particular, as the CORESET duration is getting shorter, a bigger resource is used for transmitting PDCCH in frequency domain. For example, when the CORESET duration corresponds to 1 symbol, it is necessary to have a frequency resource of 10 MHz for a candidate of an aggregation level 8. In particular, if a wide frequency resource is used, since it is able to secure frequency diversity, interleaving is not used and it is preferable to intend to improve performance by using channel estimation.

In particular, one embodiment of the present invention proposes that a CCE-to-REG mapping type of the CORESET configured by the PBCH is to be determined based on the CORESET duration. For example, if 1 symbol CORESET is configured, a UE may assume that interleaving is not used for CCE-to REG mapping. Otherwise, it may be able to define that interleaving is used for the CCE-to REG mapping. Or, whether or not interleaving is used can be determined on the basis of a resource amount within a CORESET. For example, if the number of unit resources (e.g., REG, REG bundle, CCE) within a CORESET is greater than a threshold, a UE may assume that interleaving is used. Meanwhile, the threshold can be defined in advance or can be determined via higher layer signaling. And, if interleaving is not used, a UE may assume the same precoding within a corresponding candidate or assume that a wideband RS is used.

If an REG bundle size is fixed to 6, it is preferable to use interleaving for CCE-to-REG mapping. For example, since it is able to secure channel estimation performance by an REG bundle size=6, in order to additionally obtain a frequency diversity gain, a transmission diversity gain, and the like, it is preferable to use interleaving.

* REG Bundle Size

In general, in case of a CORESET configured by RMSI (e.g., SIB1) or a CORESET configured by UE-dedicated RRC signaling, an REG bundle size capable of being assumed in the CORESET is determined according to duration of the CORESET. For example, in case of 1 symbol CORESET, an REG bundle size may correspond to 2 or 6. In case of 2 or 3 symbol CORESET, an REG bundle size may be identical to CORESET duration or may correspond to 6. A network configures an REG bundle size by one of two available values.

On the contrary, in case of a CORESET configured by a PBCH, it may be difficult to signal an REG bundle size of the CORESET via the PBCH. Hence, the REG bundle size can be fixed to a value in advance or a rule for determining the REG bundle size can be defined in advance.

For example, in the CORESET configured by the PBCH, an REG bundle size can be configured to be identical to CORESET duration of the CORESET. According to a current NR system, duration of the CORESET configured by the PBCH may correspond to a value of 1, 2, and 3. This can interpreted as a method for increasing frequency diversity by uniformly distributing a CCE in frequency domain.

As a different example, an REG bundle size of the CORESET configured by the PBCH can be fixed to 6. In case of a type 0 CSS, an aggregation level is configured by 4, 8, and/or 16. In this case, since the REG bundle size=6 has good channel estimation performance and shows good performance in a high aggregation level (compared to a case of using an REG bundle size smaller than 6) in general, it is preferable to fix the REG bundle size by 6.

* Row Size of Interleaver

An interleaver used in NR system can include a block interleaver. For example, the block interleaver writes an REG bundle (or REG bundle set) along with a row and then reads the REG bundle along with a column. Or, the block interleaver writes an REG bundle (or REG bundle set) along with a column and then reads the REG bundle along with a row. By doing so, the interleaver can perform interleaving.

In case of using an interleaver with a CCE-to-REG mapping method, it is necessary to determine a row size of the interleaver. The row size of the interleaver may indicate a distribution level of consecutive REG bundles. Specifically, a resource of a CORESET is divided into blocks as many as the row size of the interleaver in frequency domain and consecutive REG bundles belong to blocks different from each other. Meanwhile, the row size of the interleaver can also be simply referred to as an interleaver size.

In general, in a UE-dedicated CORESET, a row size of an interleaver can be configured by one selected from {2, 3, 6}.

For example, the row size of the interleaver can be signaled via a configuration of the UE-dedicated CORESET and a value resulted from dividing the total number of REG bundles by the row size becomes a column size of the interleaver. When the row size of the interleaver corresponds to 3, if interleaving is performed, a CORESET is divided into 3 frequency blocks in frequency domain and REG bundles i, i+1, and i+2 belong to the first frequency block, the second frequency block, and the third frequency block, respectively.

According to one embodiment of the present invention, in case of a CORESET configured by a PBCH, a row size of an interleaver can be differently configured/determined according to an REG bundle size.

In NR, a CCE consists of 6 REGs and an REG bundle size may have a value of 2, 3, and 6. In particular, the number of REG bundles per CCE may correspond to 1, 2, or 3. A row size of an interleaver may indicate a distribution level of REG bundles constructing a CCE in frequency domain. Hence, the row size of the interleaver can be determined according to an REG bundle size assumed in a CORESET configured by a PBCH or the number of REG bundles per CCE.

For example, if an REG bundle size corresponds to 2, 1 CCE corresponds to 3 REG bundles. In order to sufficiently obtain a frequency diversity gain, it is preferable to divide the entire frequency domain into 3 regions and arrange the 3 REG bundles constructing 1 CCE to the 3 regions different from each other. In particular, if an REG bundle size corresponds to 2, a row size of an interleaver can be defined by 3. For the same reason, if an REG bundle size corresponds to 3, since 1 CCE corresponds to 2 REG bundles, a row size of an interleaver can be defined by 2.

If an REG bundle size corresponds to 6, since 1 CCE corresponds to 1 REG bundle, it is preferable to determine a row size of an interleaver in consideration of an AL. For example, if an REG bundle size corresponds to 6, a row size of an interleaver can be defined by 4. If the row size is greater than 4, since a frequency diversity gain seldom increases, it is preferable to uniformly distribute candidates of AL 4 in terms of performance.

Meanwhile, if an REG bundle size of a CORESET configured by a PBCH is fixed to a specific value, a row size of an interleaver can be fixed as well. If the REG bundle size is fixed to 2 or 3, the row size of the interleaver can be fixed to 3 or 2 to distribute REG bundles belonging to a CCE as much as possible. Or, the row size of the interleaver can be fixed to 6 to distribute candidates of AL 2 or 4 as much as possible.

If the REG bundle size is fixed to 6, it may be able to introduce a row size of 4, which is not included in a legacy row size, as a row size of an interleaver and the row size of the interleaver can be fixed to 4. By doing so, it is able to distribute 4 CCEs belonging to a candidate of an aggregation level 4 as much as possible within a CORESET. Or, the row size of the interleaver can be fixed to a value of 2, 3, and 6. Or, the row size 6 can be excluded. When a CORESET includes the small amount of resources, if the CORESET is divided into 6 sub-blocks, a CCE can be localized. Hence, if the bundle size is fixed to 6, it is preferable to fix the row size of the interleaver to 2 or 3. If the row size of the interleaver corresponds to 3, it may be able to have a merit in that it is able to additionally obtain a frequency diversity gain in a low AL compared to a case that the row size of the interleaver corresponds to 2.

\* Precoder Granularity

In NR, precoder granularity (in frequency domain) can be configured by a first configuration value identical to an REG bundle size in frequency domain. Or, the precoder granularity can be configured by a second configuration value to enable a UE to assume the same precoder (e.g., same precoding) within contiguous RBs of a corresponding CORESET. For clarity, the second configuration value is referred to as larger precoder granularity. Or, the second configuration value can also be referred to as a wideband RS configuration and the first configuration value can also be referred to as a narrowband RS configuration.

As mentioned in the foregoing description, when a CORESET is configured by a PBCH in an initial access procedure, since information capable of being signaled by the PBCH is limitative, precoder granularity can be fixed in advance or can be implicitly determined by a different value.

If the precoder granularity is fixed in advance, it may be able to define that larger precoder granularity is applied to the CORESET configured by the PBCH (e.g., fixed to the second configuration value). In this case, although it is unable to obtain transmission diversity by precoder cycling, it may have a merit in that it is able to increase channel estimation performance.

On the other hand, if the precoder granularity is fixed to an REG bundle size (e.g., fixed to the first configuration value), although channel estimation performance is degraded, it is able to obtain a frequency diversity gain. Hence, it may be able to expect the enhancement of control channel reception performance in a channel state that fluctuation is severe. For example, if an REG bundle size is fixed to 6, since channel estimation performance increases within an REG bundle, precoder granularity can be fixed to an REG bundle size (in frequency domain).

As a different method, precoder granularity can be determined according to resource allocation of a CORESET configured by a PBCH. For example, the precoder granularity can be determined according to time duration (i.e., number of OFDM symbols) of the CORESET. For example, if time duration of the CORESET corresponds to 1, a UE assumes larger precoder granularity (e.g., assume a second configuration value). If the time duration of the CORESET is greater than 1, the UE may assume precoder granularity with an REG bundle size (e.g., assume a first configuration value).

If an REG bundle size corresponds to 6, it may be preferable for a UE to assume that precoder granularity is identical to the REG bundle size (in frequency domain) (e.g., assume a first configuration value). As mentioned in the foregoing description, channel estimation performance can be guaranteed by an REG bundle size=6 and it is preferable to use a narrowband RS to additionally obtain a frequency diversity gain and a transmission diversity gain.

\* CORESET ID

In order to configure a linkage between a CORESET and a search space set, a CORESET ID can be set to each CORESET. The configuration of the CORESET ID can be performed by RRC signaling or the like. However, in case of a CORESET configured by a PBCH, it is unable to use additional signaling for the CORESET ID.

Hence, an ID of the CORESET configured by the PBCH can be fixed to 0.

Figure 4:
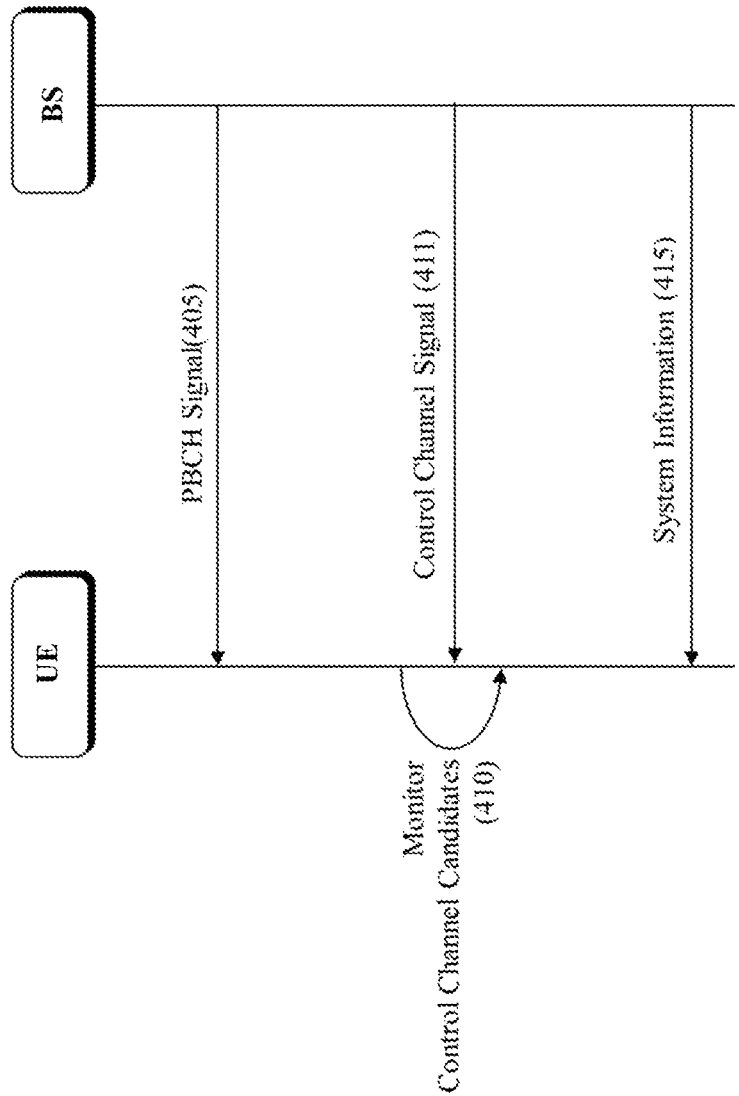
FIG. 4 is a flowchart for a method of transmitting/receiving a downlink signal according to one embodiment of the present invention.

FIG. 4 is a flowchart for a method of transmitting/receiving a downlink signal according to one embodiment of the present invention. Explanation on contents overlapped with the aforementioned contents is omitted. The present invention is not limited by FIG. 4.

Referring to FIG. 4, a UE receives a physical broadcast channel (PBCH) signal in a synchronization block (SSB) [405].

The UE monitors, in a specific control resource set (CORESET) configured based on the PBCH signal, candidates of a control channel (e.g., PDCCH), which schedules system information [410].

A base station transmits, in the specific control resource set (CORESET) configured based on the PBCH signal, a signal of the control channel, which schedules the system information [411].

The UE obtains the system information scheduled by the control channel [415].

The UE can obtain, through the PBCH signal, only a part of the entire parameters for configuring the specific CORESET. The UE can monitor the candidates of the control channel by assuming that remaining parameters for configuring the specific CORESET not obtained through the PBCH signal are fixed as follows: a size of 1 resource element group (REG) bundle is fixed to 6-REG, a control channel element (CCE)-to-REG mapping type is fixed to interleaving, a row size of an interleaver for interleaving is fixed to 2, and a precoder granularity which is a unit of the same precoding assumption is fixed to 1 REG bundle.

The system information corresponds to a system information block (SIB) 1 and the specific CORESET may correspond to a CORESET 0 for transmitting the SIB 1.

The PBCH signal can indicate information on a monitoring period where the UE should monitor the candidates of the control channel scheduling the system information in the specific CORESET.

The parameters for configuring the specific CORESET obtained by the UE from the PBCH signal can include a bandwidth of the specific CORESET and the number of symbols of the specific CORESET. The bandwidth of the specific CORESET and the number of symbols of the specific CORESET can be jointly encoded within the PBCH signal.

The bandwidth of the specific CORESET obtained from the PBCH signal can be restricted to one resource unit (e.g., RBs) among 24, 48, and 96 resource units.

The parameters for configuring the specific CORESET obtained by the UE from the PBCH signal can further include an offset for indicating a position of the specific CORESET in frequency domain based on the SSB.

The UE can monitor the candidates of the control channel by assuming that CCE aggregation levels of the candidates of the control channel and the number of candidates per each CCE aggregation level are fixed.

Figure 5:
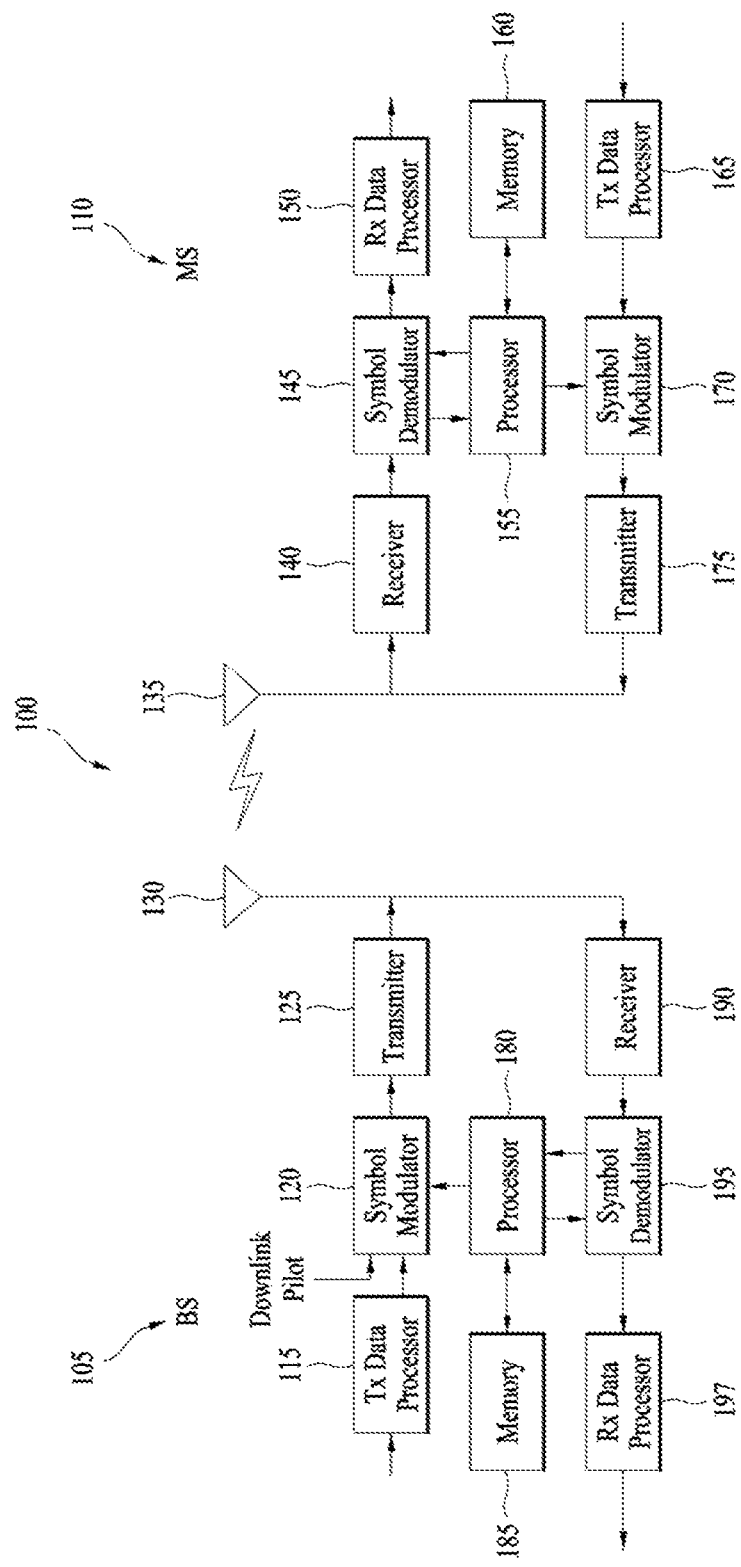
FIG. 5 illustrates a user equipment and a base station according to one embodiment of the present invention.

FIG. 5 is a block diagram illustrating a structure of a base station (BS) 105 and a UE 110 in a wireless communication system 100 according to an embodiment of the present invention. The structure of the BS 105 and the UE 110 of FIG. 5 are merely an embodiment of a BS and a UE for implementing the aforementioned method and the structure of a BS and a UE according to the present invention is not limited to FIG. 5. The BS 105 may also be referred to as an eNB or a gNB. The UE 110 may also be referred to as a user terminal.

Although one BS 105 and one UE 110 are illustrated for simplifying the wireless communication system 100, the wireless communication system 100 may include one or more B Ss and/or one or more UEs.

The BS 105 may include a transmission (Tx) data processor 115, a symbol modulator 120, a transmitter 125, a transmission/reception antenna 130, a processor 180, a memory 185, a receiver 190, a symbol demodulator 195, and a reception (Rx) data processor 197. The UE 110 may include a Tx data processor 165, a symbol modulator 170, a transmitter 175, a transmission/reception antenna 135, a processor 155, a memory 160, a receiver 140, a symbol demodulator 155, and an Rx data processor 150. In FIG. 12, although one antenna 130 is used for the BS 105 and one antenna 135 is used for the UE 110, each of the BS 105 and the UE 110 may also include a plurality of antennas as necessary. Therefore, the BS 105 and the UE 110 according to the present invention support a Multiple Input Multiple Output (MIMO) system. The BS 105 according to the present invention can support both a Single User-MIMO (SU-MIMO) scheme and a Multi User-MIMO (MU-MIMO) scheme.

In downlink, the Tx data processor 115 receives traffic data, formats the received traffic data, codes the formatted traffic data, interleaves the coded traffic data, and modulates the interleaved data (or performs symbol mapping upon the interleaved data), such that it provides modulation symbols (i.e., data symbols). The symbol modulator 120 receives and processes the data symbols and pilot symbols, such that it provides a stream of symbols.

The symbol modulator 120 multiplexes data and pilot symbols, and transmits the multiplexed data and pilot symbols to the transmitter 125. In this case, each transmission (Tx) symbol may be a data symbol, a pilot symbol, or a value of a zero signal (null signal). In each symbol period, pilot symbols may be successively transmitted during each symbol period. The pilot symbols may be an FDM symbol, an OFDM symbol, a Time Division Multiplexing (TDM) symbol, or a Code Division Multiplexing (CDM) symbol.

The transmitter 125 receives a stream of symbols, converts the received symbols into one or more analog signals, and additionally adjusts the one or more analog signals (e.g., amplification, filtering, and frequency upconversion of the analog signals), such that it generates a downlink signal appropriate for data transmission through an RF channel. Subsequently, the downlink signal is transmitted to the UE through the antenna 130.

Configuration of the UE 110 will hereinafter be described in detail. The antenna 135 of the UE 110 receives a DL signal from the BS 105, and transmits the DL signal to the receiver 140. The receiver 140 performs adjustment (e.g., filtering, amplification, and frequency downconversion) of the received DL signal, and digitizes the adjusted signal to obtain samples. The symbol demodulator 145 demodulates the received pilot symbols, and provides the demodulated result to the processor 155 to perform channel estimation.

The symbol demodulator 145 receives a frequency response estimation value for downlink from the processor 155, demodulates the received data symbols, obtains data symbol estimation values (indicating estimation values of the transmitted data symbols), and provides the data symbol estimation values to the Rx data processor 150. The Rx data processor 150 performs demodulation (i.e., symbol-demapping) of data symbol estimation values, deinterleaves the demodulated result, decodes the deinterleaved result, and recovers the transmitted traffic data.

The processing of the symbol demodulator 145 and the Rx data processor 150 is complementary to that of the symbol modulator 120 and the Tx data processor 115 in the BS 205.

The Tx data processor 165 of the UE 110 processes traffic data in uplink, and provides data symbols. The symbol modulator 170 receives and multiplexes data symbols, and modulates the multiplexed data symbols, such that it can provide a stream of symbols to the transmitter 175. The transmitter 175 obtains and processes the stream of symbols to generate an uplink (UL) signal, and the UL signal is transmitted to the BS 105 through the antenna 135. The transmitter and the receiver of UE/BS can be implemented as a single radio frequency (RF) unit.

The BS 105 receives the UL signal from the UE 110 through the antenna 130. The receiver processes the received UL signal to obtain samples. Subsequently, the symbol demodulator 195 processes the symbols, and provides pilot symbols and data symbol estimation values received via uplink. The Rx data processor 197 processes the data symbol estimation value, and recovers traffic data received from the UE 110.

A processor 155 or 180 of the UE 110 or the BS 105 commands or indicates operations of the UE 110 or the BS 105. For example, the processor 155 or 180 of the UE 110 or the BS 105 controls, adjusts, and manages operations of the UE 210 or the BS 105. Each processor 155 or 180 may be connected to a memory unit 160 or 185 for storing program code and data. The memory 160 or 185 is connected to the processor 155 or 180, such that it can store the operating system, applications, and general files.

The processor 155 or 180 may also be referred to as a controller, a microcontroller), a microprocessor, a microcomputer, etc. In the meantime, the processor 155 or 180 may be implemented by various means, for example, hardware, firmware, software, or a combination thereof. In a hardware configuration, methods according to the embodiments of the present invention may be implemented by the processor 155 or 180, for example, one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present invention may be implemented in the form of modules, procedures, functions, etc. which perform the above-described functions or operations. Firmware or software implemented in the present invention may be contained in the processor 155 or 180 or the memory unit 160 or 185, such that it can be driven by the processor 155 or 180.

Radio interface protocol layers among the UE 110, the BS 105, and a wireless communication system (i.e., network) can be classified into a first layer (L1 layer), a second layer (L2 layer) and a third layer (L3 layer) on the basis of the lower three layers of the Open System Interconnection (OSI) reference model widely known in communication systems. A physical layer belonging to the first layer (L1) provides an information transfer service through a physical channel. A Radio Resource Control (RRC) layer belonging to the third layer (L3) controls radio resources between the UE and the network. The UE 110 and the BS 105 may exchange RRC messages with each other through the wireless communication network and the RRC layer.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their

What is claimed is:

1. A method of receiving a downlink signal by a user equipment (UE) in a wireless communication system, the method comprising:
   receiving a physical broadcast channel (PBCH) signal in a synchronization signal block (SSB);
   receiving, in a first control resource set (CORESET) configured based on the PBCH signal, a first control channel which schedules system information; and
   obtaining the system information scheduled by the first control channel,
   wherein the first CORESET is configured based on parameters included in the PBCH signal and parameters not included in the PBCH signal,
   wherein the parameters included in the PBCH signal comprise a bandwidth for the first CORESET and a number of symbols for the first CORESET,
   wherein the bandwidth for the first CORESET and the number of symbols for the first CORESET are indicated by a jointly encoded value within the PBCH signal,
   wherein the parameters not included in the PBCH signal comprise a resource element group (REG) bundle size for the first CORESET, and
   wherein the REG bundle size for the first CORESET is fixed to 6-REG.

2. The method of claim 1, wherein the parameters included in the PBCH signal comprise a monitoring period where the UE monitors candidates of the first control channel in the first CORESET.

3. The method of claim 1, wherein the bandwidth for the first CORESET is restricted to 24, 48 or 96 resource units.

4. The method of claim 1, wherein the parameters included in the PBCH signal further comprise an offset for indicating a position of the first CORESET in a frequency domain based on the SSB.

5. The method of claim 1, wherein the parameters not included in the PBCH signal comprise control channel element (CCE) aggregation levels related to the first CORESET and a number of candidates for each of the CCE aggregation level, and
   wherein the CCE aggregation levels related to the first CORESET and the number of candidates for each of the CCE aggregation levels are fixed.

6. The method of claim 1, further comprising
   receiving a UE-dedicated higher layer signal; and
   receiving, in a second CORESET configured based on the UE-dedicated higher layer signal, a second control channel, wherein the UE-dedicated higher layer signal includes following parameters:
frequency resources for the second CORESET, and
time resources for the second CORESET.

7. The method of claim 6, wherein the UE-dedicated higher layer signal further includes a following parameter:
an REG bundle size for the second CORESET.

8. The method of claim 6, wherein the UE-dedicated higher layer signal further includes following parameters:
CCE aggregation levels, and
a number of candidates per CCE aggregation level.

9. A method of transmitting a downlink signal by a base station in a wireless communication system, the method comprising:
transmitting a physical broadcast channel (PBCH) signal in a synchronization signal block (SSB);
transmitting, in a first control resource set (CORESET) configured based on the PBCH signal, a first control channel which schedules system information; and
transmitting the system information scheduled by the first control channel,
wherein the first CORESET is configured based on parameters included in the PBCH signal and parameters not included in the PBCH signal,
wherein the parameters included in the PBCH signal comprise a bandwidth for the first CORESET and a number of symbols for the first CORESET,
wherein the bandwidth for the first CORESET and the number of symbols for the first CORESET are indicated by a jointly encoded value within the PBCH signal,
wherein the parameters not included in the PBCH signal comprise a resource element group (REG) bundle size for the first CORESET, and
wherein the REG bundle is fixed to 6-REG.

10. The method of claim 9, wherein the parameters included in the PBCH signal comprise a monitoring period where a user equipment (UE) monitors the first control channel in the first CORESET.

11. The method of claim 9, wherein the bandwidth for the first CORESET is restricted to 24, 48 or 96 resource units.

12. The method of claim 9, wherein the parameters included in the PBCH signal further comprise an offset for indicating a position of the first CORESET in a frequency domain based on the SSB.

13. The method of claim 9, wherein the parameters not included in the PBCH signal comprise control channel element (CCE) aggregation levels related to the first CORESET and a number of candidates for each of the CCE aggregation level, and
wherein the CCE aggregation levels related to the first CORESET and the number of candidates for each of the CCE aggregation levels are fixed.

14. The method of claim 9, further comprising:
transmitting a UE-dedicated higher layer signal; and
transmitting, in a second CORESET configured based on the UE-dedicated higher layer signal, a second control channel,
wherein the UE-dedicated higher layer signal includes following parameters:
frequency resources for the second CORESET, and
time resources for the second CORESET.

15. The method of claim 14, wherein the UE-dedicated higher layer signal further includes a following parameter:
an REG bundle size for the second CORESET.

16. The method of claim 14, wherein the UE-dedicated higher layer signal further includes following parameters:
CCE aggregation levels, and
a number of candidates per CCE aggregation level.

17. A user equipment (UE) for receiving a downlink signal, the UE comprising:
at least one transceiver;
at least one processor; and
at least one computer memory operably connectable to the at least one processor and storing instructions that, when executed, cause the at least one processor to perform operations comprising:
receiving, via the at least one transceiver, a physical broadcast channel (PBCH) signal in a synchronization signal block (SSB);
receiving, via the at least one transceiver, a first control channel, which schedules system information, in a first control resource set (CORESET) configured based on the PBCH signal; and
obtaining the system information scheduled by the first control channel,
wherein the first CORESET is configured based on parameters included in the PBCH signal and parameters not included in the PBCH signal,
wherein the parameters included in the PBCH signal comprise a bandwidth for the first CORESET and a number of symbols for the first CORESET,
wherein the bandwidth for the first CORESET and the number of symbols for the first CORESET are indicated by a jointly encoded value within the PBCH signal,
wherein the parameters not included in the PBCH signal comprise a resource element group (REG) bundle size for the first CORESET, and
wherein the REG bundle size for the first CORESET is fixed to 6-REG.

18. The UE of claim 17, wherein the operations further comprise:
receiving a UE-dedicated higher layer signal; and
receiving, in a second CORESET configured based on the UE-dedicated higher layer signal, a second control channel,
wherein the UE-dedicated higher layer signal includes following parameters:
frequency resources for the second CORESET, and
time resources for the second CORESET.

19. The UE of claim 18, wherein the UE-dedicated higher layer signal further includes a following parameter:
an REG bundle size for the second CORESET.

20. The UE of claim 18, wherein the UE-dedicated higher layer signal further includes following parameters:
CCE aggregation levels, and
a number of candidates per CCE aggregation level.

* * * * *

UNITED STATES PATENT AND TRADEMARK OFFICE
CERTIFICATE OF CORRECTION

| | |
|---|---|
| PATENT NO. | : 10,547,413 B2 |
| APPLICATION NO. | : 16/098724 |
| DATED | : January 28, 2020 |
| INVENTOR(S) | : Inkwon Seo and Yunjung Yi |

Page 1 of 1

It is certified that error appears in the above-identified patent and that said Letters Patent is hereby corrected as shown below:

In the Claims

Column 25, Line 37; In Claim 9, following 'wherein the REG bundle', insert -- size for the first CORESET -- therefor.

Signed and Sealed this
Nineteenth Day of May, 2020

Andrei Iancu
*Director of the United States Patent and Trademark Office*